(12) United States Patent
Lyons (10) Patent No.: US 10,644,980 B2
(45) Date of Patent: May 5, 2020

(54) AUTOMATED ENFORCEMENT OF ARCHITECTURE GUIDELINES FOR APPLICATION PROGRAMMING INTERFACES

(71) Applicant: CA, Inc., New York, NY (US)

(72) Inventor: Mike Arnold Lyons, Vancouver (CA)

(73) Assignee: CA, Inc., New York, NY (US)

( * ) Notice: Subject to any disclaimer, the term of this patent is extended or adjusted under 35 U.S.C. 154(b) by 291 days.

(21) Appl. No.: 15/472,988

(22) Filed: Mar. 29, 2017

(65) Prior Publication Data

US 2018/0288190 A1 Oct. 4, 2018

(51) Int. Cl.
| | |
|---|---|
| *H04L 12/00* | (2006.01) |
| *H04L 12/26* | (2006.01) |
| *G06F 11/30* | (2006.01) |
| *G06F 8/75* | (2018.01) |
| *G06F 8/70* | (2018.01) |

(52) U.S. Cl.
CPC ............... *H04L 43/16* (2013.01); *G06F 8/70* (2013.01); *G06F 8/75* (2013.01); *G06F 11/30* (2013.01)

(58) Field of Classification Search
CPC ........ H04L 67/34; H04L 43/16; H04L 47/803
USPC ......... 717/121; 707/802, 803, 804; 709/222, 709/223
See application file for complete search history.

(56) References Cited

U.S. PATENT DOCUMENTS

| | | | | |
|---|---|---|---|---|
| 6,370,573 | B1 * | 4/2002 | Bowman-Amuah | G06F 8/20 709/223 |
| 6,912,538 | B2 * | 6/2005 | Stapel | G06F 16/258 |
| 7,596,778 | B2 * | 9/2009 | Kolawa | G06F 11/3688 717/126 |
| 7,640,251 | B2 * | 12/2009 | Sundararajan | G06F 8/10 |
| 7,657,542 | B2 * | 2/2010 | Sundararajan | G06F 8/10 707/827 |
| 7,685,270 | B1 | 3/2010 | Vermeulen et al. | |
| 8,037,506 | B2 * | 10/2011 | Cooper | H04N 7/1675 725/93 |
| 8,955,038 | B2 * | 2/2015 | Nicodemus | G06F 11/3495 726/1 |
| 2002/0065879 | A1 * | 5/2002 | Ambrose | G06F 9/50 709/203 |
| 2006/0225124 | A1 | 10/2006 | Kolawa et al. | |
| 2007/0174185 | A1 * | 7/2007 | McGoveran | G06F 11/1474 705/39 |
| 2009/0276757 | A1 * | 11/2009 | Lindvall | G06F 8/72 717/121 |

(Continued)

*Primary Examiner* — Frantz Coby
(74) *Attorney, Agent, or Firm* — Foley & Lardner LLP (57) ABSTRACT

To determine whether a set of software services underlying an API adhere to architecture guidelines, an architecture guideline validation system analyzes program code as part of a compilation process for the services to generate a data structure that indicates an organization of the services and invocations between the services. The system analyzes the data structure to determine whether any architecture guidelines have been violated. Example architecture guidelines can include limitations on a number of successive invocations and restrictions as to a directionality of invocations (e.g. an invocation by a private, secure service to an exposed, client-facing service). If any violations are identified, the system indicates the violations and may display the violations as compiler errors or warnings.

20 Claims, 6 Drawing Sheets

(56) References Cited

U.S. PATENT DOCUMENTS

2011/0231828 A1\* 9/2011 Kaulgud .................. G06F 8/77
  717/131

\* cited by examiner

AUTOMATED ENFORCEMENT OF ARCHITECTURE GUIDELINES FOR APPLICATION PROGRAMMING INTERFACES

BACKGROUND

The disclosure generally relates to the field of data processing, and more particularly to software development, installation, and management.

Software architecture guidelines are written documents that express a structured solution to meet technical and operational requirements and ensure performance, security, and manageability of software. Architecture guidelines are important for complex software such as application programming interfaces and their underlying services. An application programming interface (API) is an interface that is defined in terms of a set of functions and procedures, and enables a program to gain access to resources. There are multiple types of APIs, such as an API for a programming language or a web API. A web API is a server-side programmatic interface that allows access to resources through a defined request-response message system. An API can be implemented by one or more services, microservices, functions, components, etc. For example, an API for retrieving user information may be implemented by a microservice which queries a user database.

BRIEF DESCRIPTION OF THE DRAWINGS

Aspects of the disclosure may be better understood by referencing the accompanying drawings.

DESCRIPTION

The description that follows includes example systems, methods, techniques, and program flows that embody aspects of the disclosure. However, it is understood that this disclosure may be practiced without these specific details. For instance, this disclosure refers to enforcing architecture guidelines for software services underlying APIs in illustrative examples. Aspects of this disclosure can be also applied to enforcing architecture guidelines for hardware such as computer systems, processors, data storage, etc. In other instances, well-known instruction instances, protocols, structures and techniques have not been shown in detail in order not to obfuscate the description.

Overview

Enforcement of architecture guidelines is needed to ensure developers follow the guidelines and maintain software quality. For software services underlying APIs in particular, enforcing architecture guidelines is crucial for ensuring interoperability among the APIs and uniform performance among the APIs. To determine whether a set of services adhere to architecture guidelines, an architecture guideline validation system analyzes program code as part of a compilation process for the services underlying an API to generate a data structure that indicates an organization of the services and invocations between the services. The system analyzes the data structure to determine whether any architecture guidelines have been violated. Example architecture guidelines can include limitations on a number of successive invocations and restrictions as to directionality of invocations (e.g. an invocation by a private, secure service to an exposed, client-facing service). If any violations are identified, the system indicates the violations and may display the violations as compiler errors or warnings.

Additionally, an architecture guideline validation system may monitor performance of the services during execution to determine the effectiveness of the architecture guidelines. The system collects telemetry during execution of the services and compares the telemetry against defined performance criteria. If a service for an API is failing to satisfy the performance criteria, the system can determine a modification to the architecture guidelines to rectify the performance issue. If one or more services are failing to satisfy the performance criteria, the system compares the services to identify a common characteristic. The system then determines an architecture guideline modification based on the common characteristic.

Terminology

The description below uses the term "program code" to refer to statements or words written in a particular programming language. Program code may be written in a variety of known languages such as C, C++, Java, Javascript, C#, Visual Basic, Python, Ruby, etc. Program code may be compiled to create an executable version of the program code, which is referred to as an application. The application may be a software program, a script, a process, a virtual machine, etc. Additionally, program code may be interpreted and run by a program or application.

The description below uses the term "service" to refer to software-implemented functionality underlying an API. For example, an API may define an interface for copying a file such as "copy(name, destination)." A service underlying this API includes the program code for performing operations to copy the file. A service can be invoked or called using the interface defined by a corresponding API. In some instances, a service may also be referred to as a microservice, component, function, command, procedure, script, etc.

The description below uses the term "invocation" to refer to a function call or remote procedure call from one service to another service. A service which is invoked or utilized by a client may in turn call or invoke other services to accomplish a task. Invocations among services may be across different APIs. For example, a service implemented for a first API may invoke another service underlying a remote API. An invocation path refers to the series of invocations resulting from execution of an originating service. For example, a client may invoke a first service which in turn invokes a second service. The second service may then invoke a third service. The invocation path created by invoking the first service then includes the first service, the second service, and the third service.

The description below uses the term "invocation graph" to refer to a data structure that depicts calls or invocations between services underlying APIs. An invocation graph consists of nodes (vertices, points) and edges (arcs, lines) that connect them. A node represents a service, and an edge between two nodes represents an invocation from one service to another service. Nodes and edges may be labeled or enriched with data. For example, a node may include an identifier for a service and telemetry for the service. An edge may be labeled to indicate different types of invocations, a hierarchical relationship between two nodes, telemetry, or a communication protocol used. In some implementations, a node may be indicated with a single value such as (A) or (B), and an edge may be indicated as an ordered or directional pair such as (A, B) or (B, A). In implementations where nodes and edges are enriched with data, nodes and edges may be indicated with data structures that allow for the additional information, such as JavaScript Object Notation ("JSON") objects, extensible markup language ("XML") files, etc.

Example Illustrations

Figure 1:
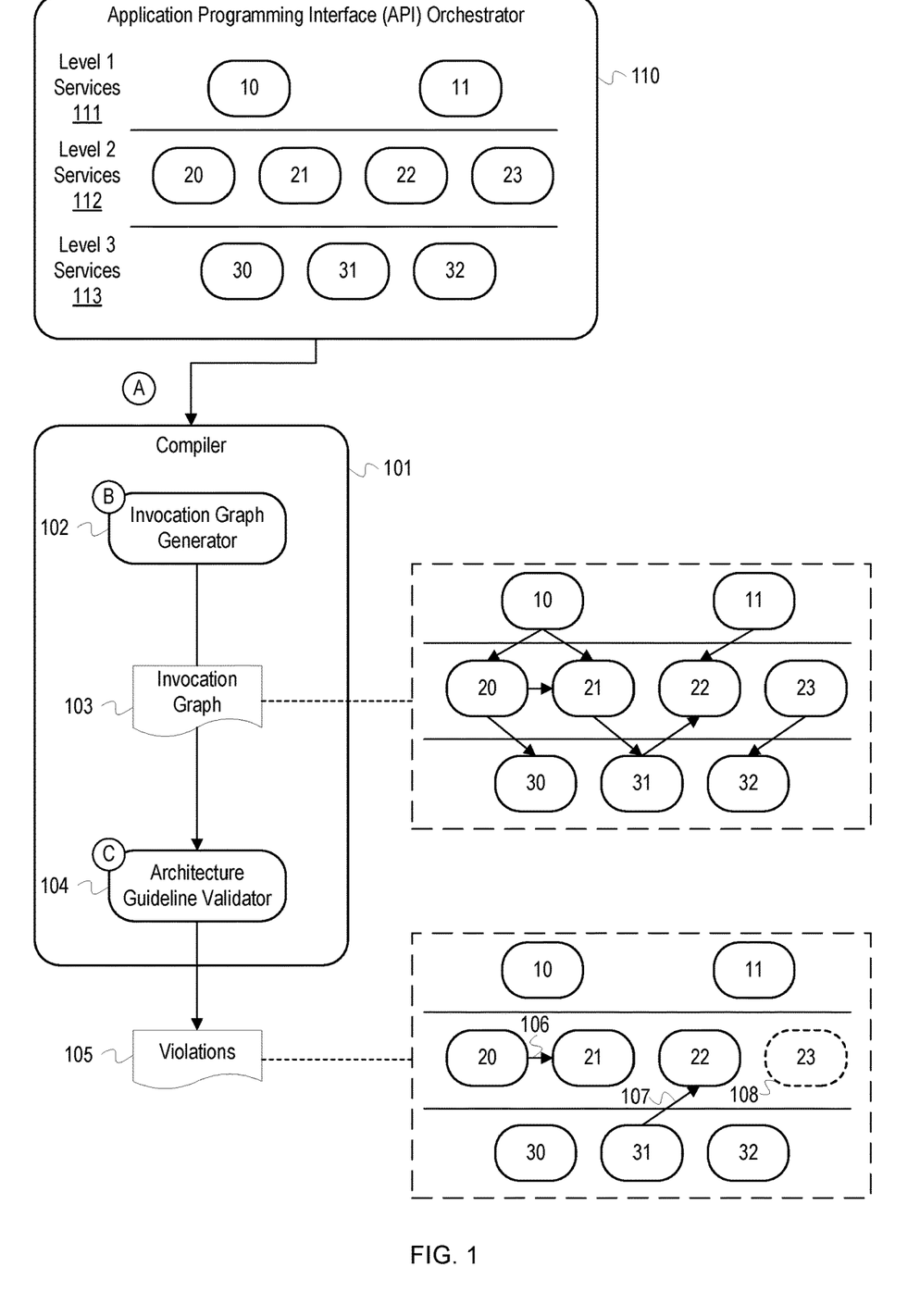
FIG. 1 depicts an example compiler which validates conformance with architecture guidelines for services underlying an API.

FIG. 1 depicts an example compiler which validates conformance with architecture guidelines for services underlying an API. FIG. 1 depicts a compiler 101 that includes an invocation graph generator 102 and an architecture guideline validator 104. FIG. 1 also depicts an API orchestrator 110 that includes multiple services for carrying out functionality for one or more APIs. The API orchestrator 110 includes level 1 services 111 (service 10, service 11), level 2 services 112 (service 20, service 21, service 22, service 23), and level 3 services 113 (service 30, service 31, service 32), hereinafter referred to as "the services."

At stage A, the compiler 101 receives program code for the API orchestrator 110 and the included services. FIG. 1 depicts a representation of the API orchestrator 110, as opposed to program code, for ease of illustration and explanation. Each service included within the API orchestrator 110 comprises program code for performing a task (i.e. a subroutine, method, process, etc.). For example, the service 10 in the level 1 services 111 may include program code for authenticating a user, and the service 20 of the level 2 services 112 may include program code for retrieving user profile information. Each service within the API orchestrator 110 may be a self-contained process within a container or virtual machine. Each service has a definition which indicates a name or identifier for the service and indicates arguments or data that are passed to the service. The definition for the service may be indicated in an API corresponding to the service. The services may invoke other services during execution using the identifiers or function names for the services. Additionally, the services can call services according to other APIs, such as third-party or remote APIs. The services may communicate synchronously or asynchronously using a remote procedure call or function call. The API orchestrator 110 facilitates communication among the services and may also include other modules for receiving/routing client requests, load balancing client requests, or instantiating additional instances of a particular API.

The services are depicted as belonging within different levels of a hierarchy: level 1 services 111, level 2 services 112, and level 3 services 113. Services may be grouped within different levels based on characteristics of the service, such as functionality or a logical ordering within a process. Services underlying client-facing APIs are typically considered level 1 services 111 since they may be directly invoked by clients or users of the APIs. Services in the level 2 services 112 and the level 3 services 113 may be kept private for security purposes or may be within a lower tier based on a process ordering. Continuing the example above, the service 20 may be within the level 2 services 112 based on the function of retrieving user profile information being a logical next step after authenticating a user at the service 10 in the level 1 services 111.

At stage B, the invocation graph generator 102 analyzes the program code of the services within the API orchestrator 110 to generate an invocation graph 103. The invocation graph 103 indicates invocations or function calls between the services. The invocation graph 103 is a data structure that includes the services as nodes and includes edges to indicate invocations between services. The invocation graph generator 102 analyzes the program code for each of the services to identify which services will be invoked during execution of a particular service. For example, the invocation graph generator 102 may search the program code for identifiers associated with other services. For each service call encountered within a particular service, the invocation graph generator 102 adds an edge between the invoking service and the invoked service in the invocation graph 103. In FIG. 1, the invocation graph generator 102 determines that the service 10 invokes the service 20 and the service 21 and adds an edge between the service 10 and the service 20 and an edge between the service 10 and the service 21. The invocation graph generator 102 analyzes each of the services until the invocation graph 103 indicates each of the invocations among the services.

During the analysis of the services, the invocation graph generator 102 may also determine characteristics for the invocations such as how many times a first service invokes a second service during a single execution or how much data is passed between services. Additionally, the invocation graph generator 102 may identify invocations of remote APIs or services outside of a network or domain. The invocation graph generator 102 may indicate this information in the edges of the invocation graph 103 or may separately indicate this information in a table. In some implementations, the invocation graph 103 can determine invocations between services based on the program code of the API orchestrator 110 or based on a configuration of the API orchestrator 110. For example, if the API orchestrator 110 is configured to create an interface for communication between the service 20 and the service 30, the invocation graph generator 102 determines that the service 20 invokes the service 30.

At stage C, the architecture guideline validator 104 analyzes the invocation graph 103 to determine whether the services comply with architecture guidelines. The architecture guideline validator 104 is configured to analyze the invocation graph 103 for a plurality of conditions which indicate violations of architecture guidelines. Architecture guidelines can include rules to enhance security, satisfy performance criteria, maintain encapsulation of functionality, etc. For example, to limit service latency, an architecture guideline may indicate a threshold for an invocation path length of service calls. Invocation path length refers to the number of edges between a first service in the invocation graph 103 and a second service (e.g., the path length between the service 10 and the service 30 is two). Other rules/guidelines can indicate a threshold number of service invocations allowed during a single execution for an API, indicate a threshold latency for completion of a service function, indicate which levels of services can be exposed to clients, indicate which services are allowed to access specified data resources, etc.

In FIG. 1, the architecture guideline validator 104 is configured to enforce guidelines which indicate that service invocations should not occur within a same level of a hierarchy, that invocations should not occur in an upward direction in the hierarchy, and that a lower level service must be invoked by at least one higher level API. These guidelines can be programmed as conditions which allow the architecture guideline validator 104 to validate conformance of the services. For example, a condition may be "if a service invokes a service of the same level, then determine that the guideline restricting service invocations within a same level of a hierarchy has been violated." After applying these conditions to the invocation graph 103, the architecture guideline validator 104 identifies three violations of the architecture guidelines and outputs these violations in the violations 105. The violations 105 include a violation 106, a violation 107, and a violation 108. The architecture guideline validator 104 determines that the violation 106 (i.e., the edge between the service 20 and the service 21) is a violation based on a failure to conform with the guideline of no service invocations within a same hierarchy level. Since the service 20 and the service 21 are each within the level 2 services 112, the invocation between the two services is a violation of the guidelines. The architecture guideline validator 104 determines that the violation 107 (i.e., the edge between the service 31 and the service 32) is a violation based on a failure to conform with the guideline of no service invocations in an upward direction of the service hierarchy. Since the service 31 is within the level 3 services 113 and the service 22 is within the level 2 services 112, the invocation from the service 31 to the service 22 fails to conform to the guidelines. Finally, the architecture guideline validator 104 determines that the violation 108 (i.e., the service 23) is a violation based on a failure to conform with the guideline that a lower level service must be invoked by at least one higher level API. Since the service 23 is within the level 2 services 112 and is not invoked by a service within the level 1 services 111, the service 23 fails to conform to the guidelines.

The compiler 101 may halt a compilation process for the services and display the violations 105. Alternatively, the compiler 101 may complete compilation and display the violations 105 as warnings. The compiler 101 can modify the invocation graph 103 to indicate which services or invocations are related to the violations 105. A developer can then use the depiction of the violations 105 to easily identify which services need to be modified for compliance with the architecture guidelines.

In some instances, based on a programming language used, the compiler 101 or other software interprets (as opposed to compiles) the program code for the API orchestrator 110 and the services. For example, JavaScript is an interpreted language. In such instances, the invocation graph 103 may be generated to validate conformance with architectural guidelines during a phase of the development process, such as design or packaging.

Figure 2:
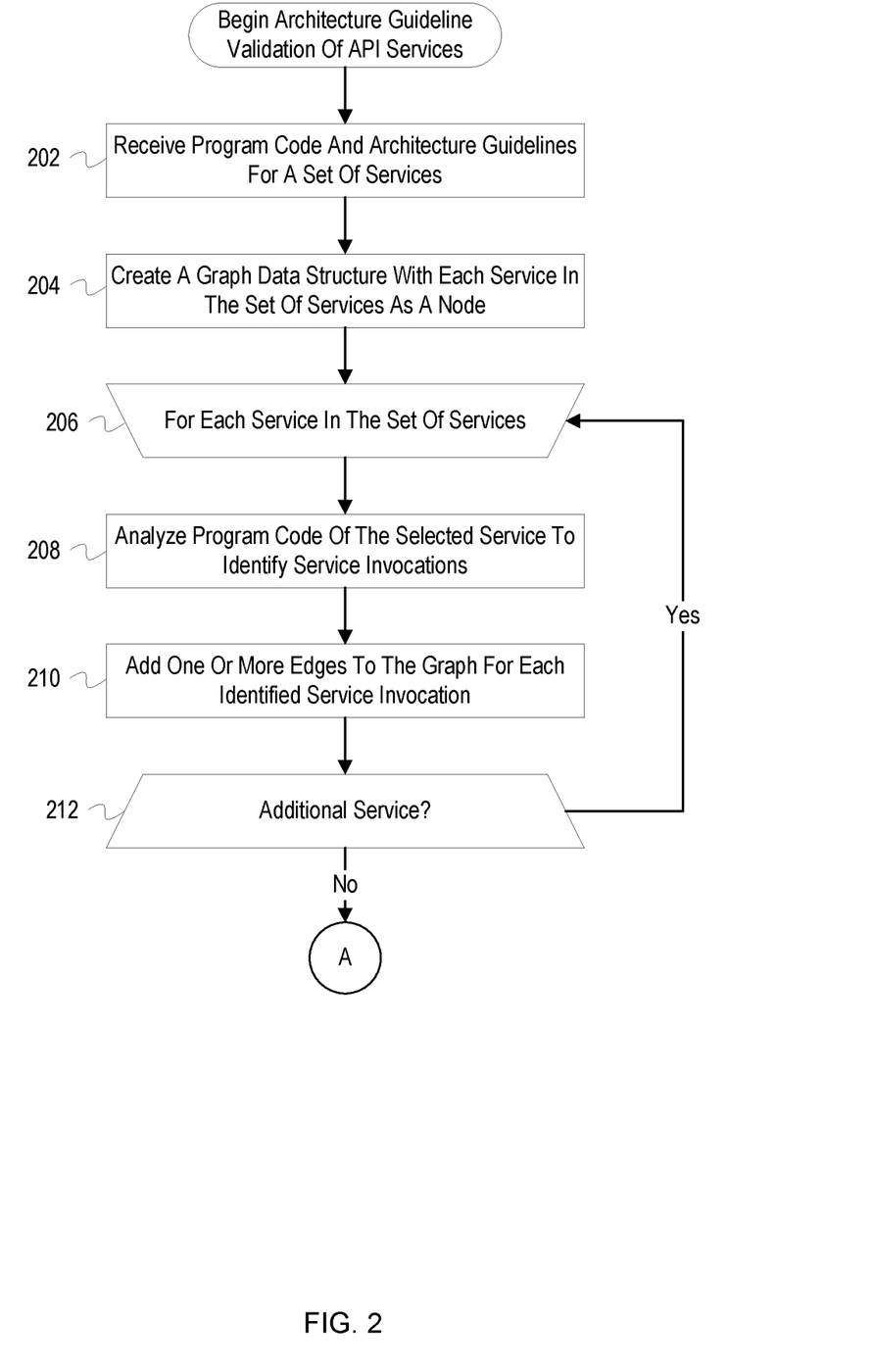
FIG. 2 depicts a flowchart with example operations for validating conformance to architecture guidelines for services underlying APIs.
Figure 3:
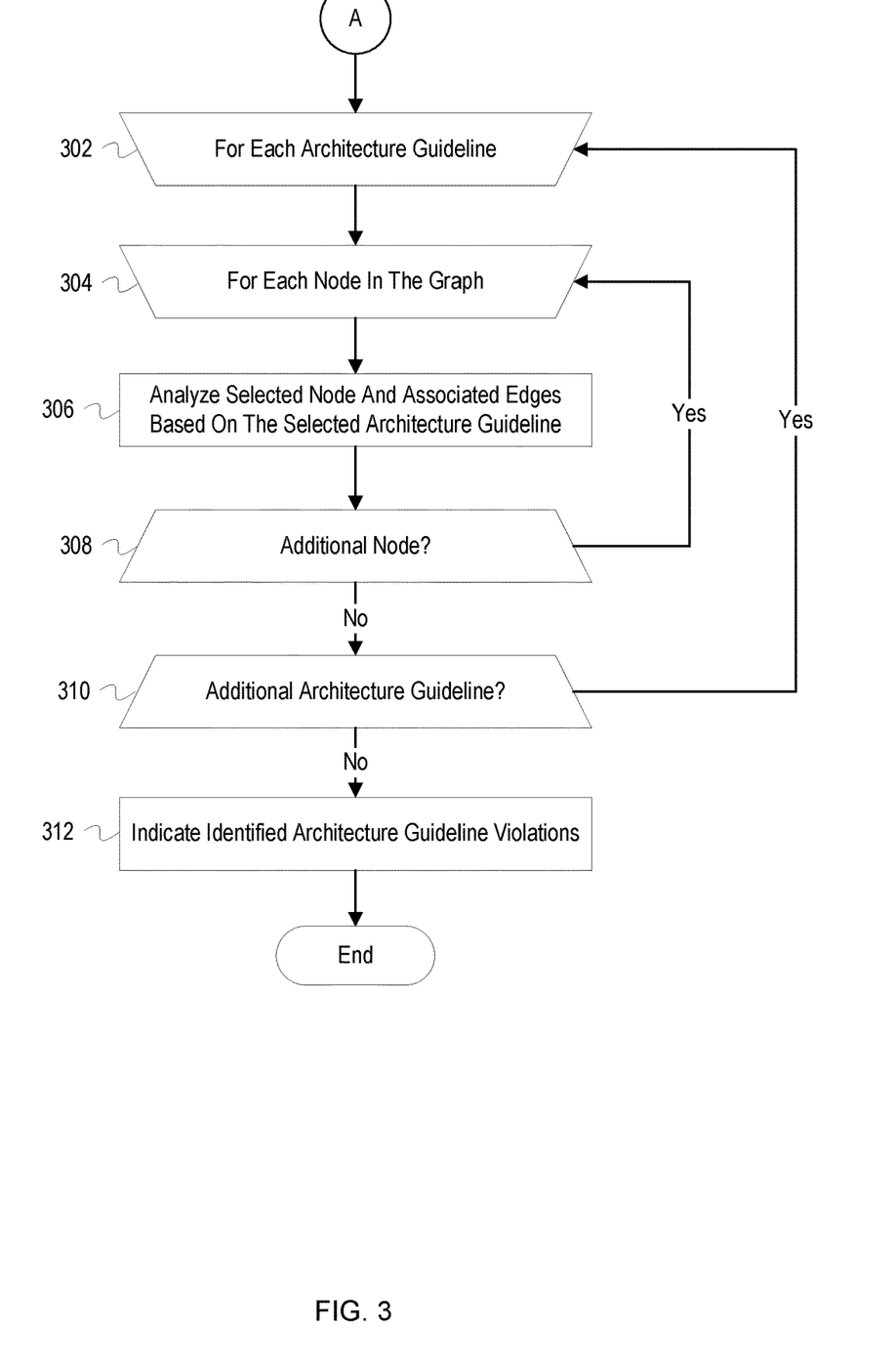
FIG. 3 depicts a flowchart with example operations for validating conformance to architecture guidelines for services underlying APIs.

FIGS. 2 and 3 depict a flowchart with example operations for validating conformance to architecture guidelines for services underlying APIs. FIGS. 2 and 3 describe an architecture guideline validator as performing the operations, although identification and naming of software can vary among implementations.

An architecture guideline validator ("validator") receives program code and architecture guidelines for a set of services underlying an API (202). The validator may be a process or script within a compiler which is executed as part of a compilation process, or the validator may be a plug-in within an integrated development environment (IDE). The validator may receive additional information along with the program code such as identifiers for each service in the set of services or a schema or model which describes a hierarchical structure of the set of services. The architecture guidelines indicate rules regarding the structure, organization, and performance of the set of services. For example, the guidelines may identify storage devices which should only be accessed by private (i.e. non-client facing) services, or the guidelines may indicate restrictions regarding invocations of remotely hosted services or services of third-party APIs. The validator receives the architecture guidelines in a configuration file or through an interface for the validator which allows for input of the guidelines. For example, the interface can display a form that allows for input of guidelines such as a maximum invocation path length, whether same-level invocations are allowed, etc.

The validator creates a graph data structure with each service in the set of services as a node (204). The validator creates the graph using the service identifiers and the schema indicating the structure of services. Alternatively, the validator analyzes the program code to determine identifiers for each of the services. The validator may also analyze program code of an API orchestrator to determine which services are client-facing or an organization of the set of services based on the information and interfaces described in the program code for the orchestrator. The graph data structure at this point in the process includes nodes, as edges to indicate invocations are added as described below. Each node can include information for the corresponding service, such as an identifier or function name for the service, what data the service accepts as arguments to a function call, a level in a service hierarchy, etc.

The validator begins analyzing each service in the set of services (206). The service currently being analyzed by the validator is hereinafter referred to as "the selected service."

The validator analyzes program code of the selected service to identify service invocations (208). The validator searches the program code using identifiers for other services in the set of services. If the validator discovers an identifier, the validator determines that the selected service invokes the service corresponding to the identifier. The validator may record how many times the identifier occurs in the program code. In some implementations, the validator may be configured to search for data accesses to specified storage devices. For example, the architecture guidelines may specify storage devices which contain sensitive information and should have access restricted to a limited number of services. If access to a storage device is discovered in the program code, the validator adds an identifier for the storage device to the information contained in the node of the selected API. The validator may also indicate a number of times the storage device is accessed.

The validator adds one or more edges to the graph for each identified service invocation (210). The validator may include additional information in the edges such as a number of invocations, how many variables are transmitted during the invocation, an amount of data transmitted, etc.

The validator determines if there is an additional service in the set of services (212). If there is an additional service, the validator selects the next service (206).

As indicated by the reference letter A, the flowchart of FIG. 2 continues to FIG. 3. If there is not an additional service, the validator begins analyzing the graph based on each architecture guideline to identify violations (302). The architecture guideline which the validator is currently applying is hereinafter referred to as "the selected architecture guideline."

The validator begins analyzing each node in the graph based on the selected architecture guideline (304). The node which the validator is currently analyzing is hereinafter referred to as "the selected node."

The validator analyzes the selected node and associated edges based on the selected architecture guideline (306). The validator analyzes information in the selected node or associated edges which corresponds to the selected architecture guideline. For example, if the selected architecture guideline indicates a threshold number of service invocations for an API, the validator determines a number of edges connected to the node and may also determine a number of invocations associated with each edge. As an additional example, if the selected architecture guideline indicates a maximum invocation path length, the validator traverses from the selected node along each of the associated edges to determine the length of each invocation path originating from the selected node. As another example, if the selected architecture guideline indicates a restriction that services cannot invoke other services of a same hierarchical level, the validator analyzes the selected node to identify the hierarchical level of the corresponding service and then analyzes each node connected to the selected node via an edge to determine a hierarchical level of the invoked services. In each of these examples, the validator determines whether the identified information indicates a violation of the selected architecture guideline. If a violation is indicated, the validator may mark the violation in the graph, record the violation in a list, etc.

The validator determines if there is an additional node in the graph (308). If there is an additional node, the validator selects the next node (304).

If there is not an additional node, the validator determines if there is an additional architecture guideline (310). If there is an additional architecture guideline, the validator selects the next architecture guideline (302).

If there is not an additional architecture guideline, the validator indicates the identified architecture guideline violations (312). The violations may be displayed within a user interface of an IDE, indicated as warnings or errors after compilation, etc. The validator can modify the graph data structure to highlight or otherwise indicate the violations. For example, the validator may remove all edges from the graph except for the edges which correspond to a violation, change a color of edges or services which are in violation of the guidelines, or otherwise modify the graph to alter a depiction of the nodes and edges corresponding to the violations.

Figure 4:
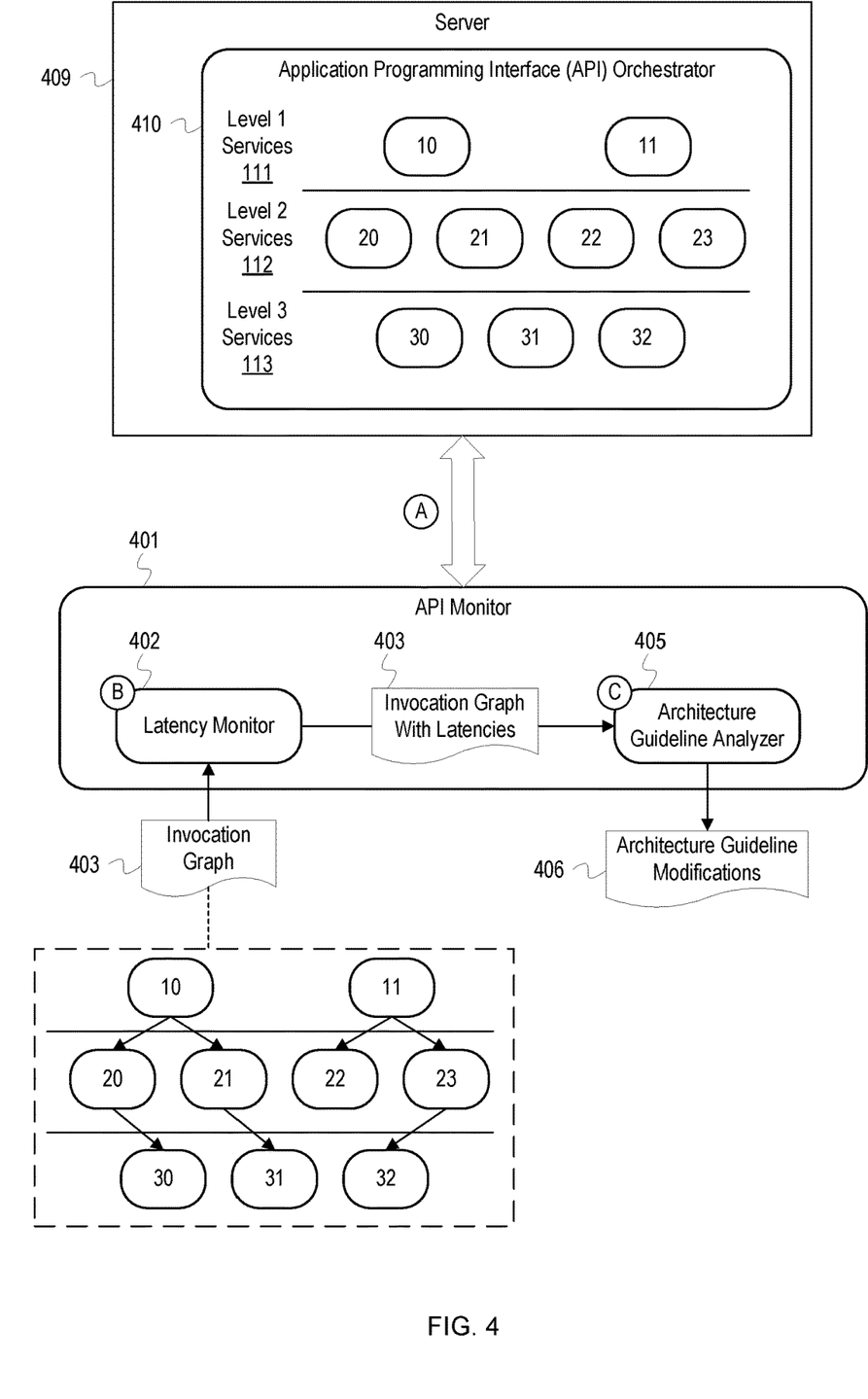
FIG. 4 depicts an example API monitoring system which monitors performance of services underlying APIs to determine modifications to architecture guidelines.

FIG. 4 depicts an example API monitoring system which monitors performance of services underlying APIs to determine modifications to architecture guidelines. FIG. 4 depicts an API monitor 401 that includes a latency monitor 402 and an architecture guideline analyzer 405. FIG. 4 also depicts an API orchestrator 410 that includes multiple services. The API orchestrator 410 includes level 1 services 411 (service 20, service 21), level 2 services 412 (service 20, service 21, service 22, service 23), and level 3 services 413 (service 30, service 31, service 32), hereinafter referred to as "the services." The API orchestrator 410 and the services are executing on a server 409. Although depicted as a single server, the server 409 may be a cluster of servers with the services distributed across the cluster, or the server 409 may be another type of computer, such as a desktop, laptop, etc. Additionally, the services may invoke other services outside of the services managed by the API orchestrator 410, such as services of a remote API.

At stage A, the API monitor 401 monitors execution of the services on the server 409. The API orchestrator 110 may be instrumented with agents or probes that monitor the services and collect telemetry for the API monitor 401. An agent or probe is a software process that runs in an environment with a service to monitor performance of the service. The agents can report telemetry such as resource consumption (e.g. storage, memory, bandwidth, etc.), execution time, processor consumption, number of invocations, etc. The API monitor 401 monitors and processes the telemetry during execution of the services to ensure that the services and any corresponding hardware are performing properly. For example, the API monitor 401 may determine that a service is malfunctioning based on an agent of another service indicating that the service is not responding.

At stage B, the latency monitor 402 of the API monitor 401 uses an invocation graph 403 and telemetry received from agents of the API orchestrator 410 to determine latencies for invocation paths of the services. The invocation graph 403 is a graph that indicates invocations among the services such as the invocation graph 103 generated by the invocation graph generator 102 as described in FIG. 1. Invocation paths refer to a series of invocations that occur during execution of services for an API. In FIG. 4, for example, the invocation graph 403 illustrates an invocation path originating from the service 11 which calls the service 23 which calls the service 32. The latency monitor 402 analyzes received performance metrics to determine a total latency for each invocation path. For example, for the latency path described above, the latency monitor 402 retrieves latency metrics determined by an agent for the service 11. The latency refers to the time between when an invocation is sent from a first service to a second service and when a response is received at the first service from the second service. So, the latency measured at the service 11 for the invocation to the service 23 will also encompass the latency encountered during the invocation of the service 32 by the service 23. The latency monitor 402 may also retrieve a latency metric for the invocation from the service 23 to the service 32 to determine a percentage of the total latency attributable to the invocation from the service 23 to the service 32. The latency monitor 402 adds the latencies to the invocation graph 403 by indicating the latencies on the edges in the invocation graph 403. In some implementations, the latency monitor 402 may create a table with an identifier for each invocation path and associate the identifiers with the corresponding latency metrics. After adding the latencies to the invocation graph 403, the latency monitor 402 sends the invocation graph 403 with the latencies to the architecture guideline analyzer 405.

At stage C, the architecture guideline analyzer 405 analyzes the invocation graph 403 with latencies to determine whether any modifications to the architecture guidelines should be made to accomplish performance goals. Performance goals may be expressed in a variety of ways such as a desired number of service requests completed per minute, an amount of bandwidth consumed, etc. In FIG. 4, the architecture guideline analyzer 405 determines whether a performance goal of staying below a threshold latency for each invocation path is being satisfied. The architecture guideline analyzer 405 compares the total latency for each invocation path to the latencies indicated in the invocation graph 403. The architecture guideline analyzer 405 then analyzes characteristics of the invocation paths which exceed the threshold latency. If the architecture guideline analyzer 405 identifies a common characteristic, the architecture guideline analyzer 405 determines an architecture guideline modification to correct the common characteristic. For example, the architecture guideline analyzer 405 may determine that each of the invocation paths which exceed the threshold latency has a path length of 5 or greater. Based on identification of this common characteristic, the architecture guideline analyzer 405 determines that the architecture guidelines should be modified to reduce the maximum path length to 4. After determining modifications, the architecture guideline analyzer 405 outputs the architecture guideline modifications 406. In some implementations, the architecture guideline analyzer 405 may automatically implement the architecture guideline modifications 406 by changing an architecture guidelines definition file to reflect the modifications. The architecture guideline modifications 406 can then be enforced during a subsequent development phase by the architecture guideline validator 104 described in FIG. 1.

Although FIG. 4 focuses on latency as a metric, in other implementations, additional telemetry may be analyzed, such as resource consumption, a total number of storage read/write requests, bandwidth consumption, etc. The architecture guideline analyzer 405 can analyze the telemetry in a manner similar to that described for latency and determine architecture guideline modifications based on the other telemetry.

FIGS. 1 and 4 are each annotated with a series of letters A-C. These letters represent stages of operations. Although these stages are ordered for these examples, the stages illustrate one example to aid in understanding this disclosure and should not be used to limit the claims. Subject matter falling within the scope of the claims can vary with respect to the order and some of the operations.

Figure 5:
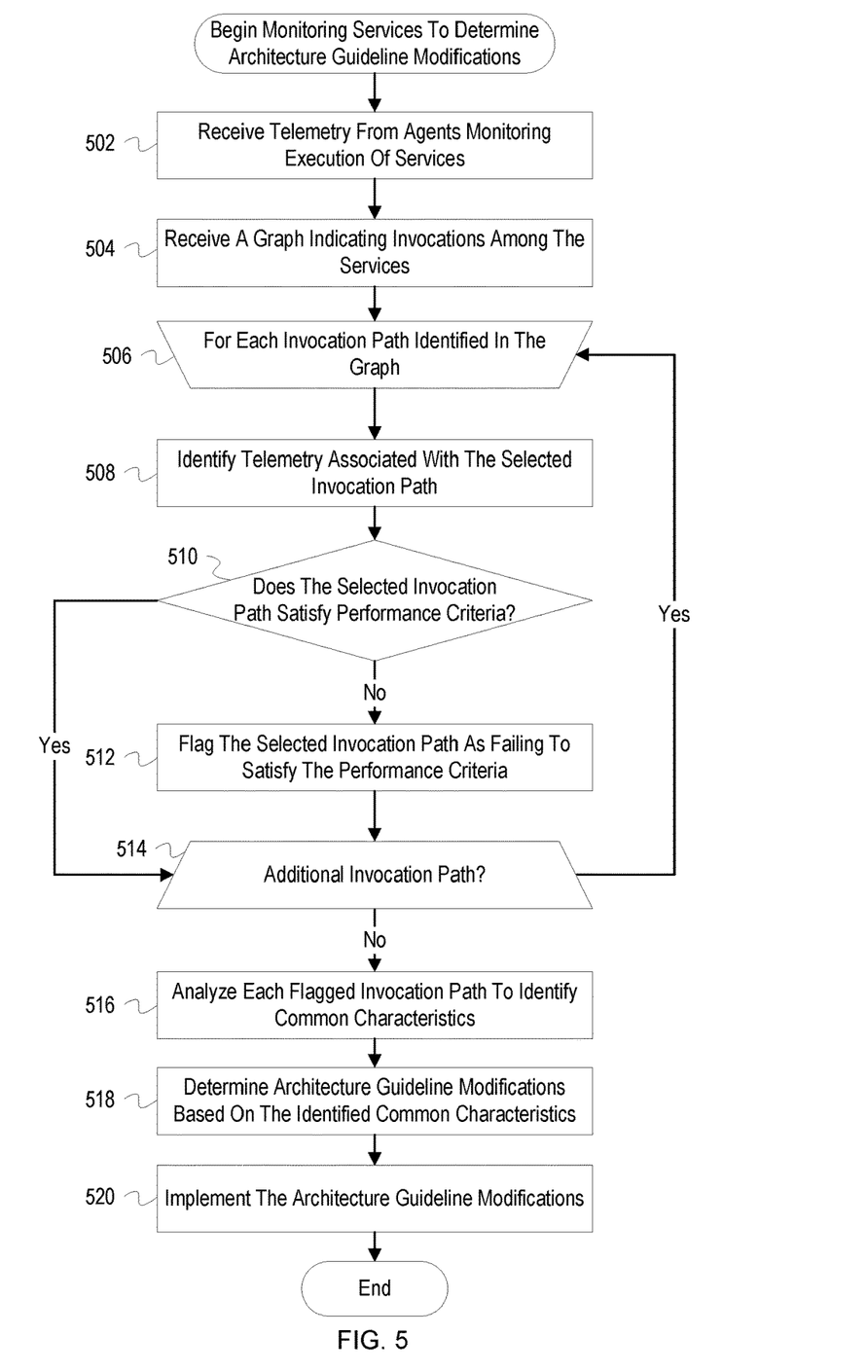
FIG. 5 depicts a flowchart with example operations for monitoring services underlying an API to determine architecture guideline modifications.

FIG. 5 depicts a flowchart with example operations for monitoring services underlying an API to determine architecture guideline modifications. FIG. 5 describes an API monitoring system as performing the operations, although identification and naming of software can vary among implementations.

The API monitoring system ("system") receives telemetry from agents monitoring execution of service services (502). The agents execute within a same environment (e.g. server, cluster, etc.) as the services to monitor for events and performance of the services. The agents measure performance, such as resource consumption and latency, and record events, such as service invocations and failures. The agents transmit the telemetry and events to the system. The system analyzes the information to determine whether the services are functioning properly and for quality assurance purposes. The system also processes and associates the information with identifiers for corresponding services.

The system receives a graph indicating invocations among the services (504). The graph may have been generated during a compilation process for the services, or the system may generate the graph using operations similar to those described in FIG. 3.

The system begins analyzing each node and corresponding edges in the graph (506). The system may traverse the graph to identify each unique invocation path and assign identifiers or otherwise record an indication of the invocation paths. For example, the system may create a tuple for each invocation path that includes identifiers for the nodes in the path. The system then iterates through each identified invocation path. The invocation path currently being analyzed by the system is hereinafter referred to as "the selected invocation path."

The system identifies telemetry associated with the selected invocation path (508). The system searches the telemetry received from the agents using identifiers for services in the selected invocation path. For example, the system may query a database or log using the identifiers. The system may be configured to narrow the search to retrieve specified telemetry. For example, the system may be configured to analyze telemetry related to latency, storage access, resource consumption, etc.

The system determines whether the selected invocation path satisfies performance criteria (510). Performance of the services can be measured in a variety of ways, such as latency, resource consumption, service requests completed per minute, etc. The performance criteria can include various limitations for each of these measurements, such as latency thresholds, a target bandwidth consumption, a target memory consumption, etc. The system uses the identified telemetry for the invocation path to determine whether the performance criteria has been satisfied. For example, the system may compare bandwidth consumed during communication between the services in the selected invocation path to the target bandwidth consumption. If the system determines that the values indicated in the telemetry do not satisfy the performance criteria, the system determines that the selected invocation path does not satisfy the performance criteria.

If the selected invocation path does not satisfy the performance criteria, the system flags the selected invocation path as failing to satisfy the performance criteria (512). The system may modify the selected invocation path in the graph to include information related the performance criteria which were not satisfied. For example, if the selected invocation path failed to meet a performance criterion for latency, the system may modify the edges of the selected invocation path in the graph to include latency values. The system may also add an indication for the selected invocation path to a list of invocation paths which failed to satisfy the performance criteria.

If the selected invocation path does satisfy the performance criteria or after flagging the selected invocation path for failing to satisfy the performance criteria, the system determines whether there is an additional invocation path (514). If there is an additional invocation path, the system selects the next invocation path indicated in the graph (506).

If there is not an additional invocation path, the system analyzes each flagged invocation path to identify common characteristics among the flagged invocation paths (516). The system processes the flagged invocation paths to group them based on which performance criterion was not satisfied, e.g. a group for excessive resource consumption, a group for high latency, etc. The system then analyzes each group to determine common characteristics which may indicate a cause of the invocation paths failure to satisfy performance criteria. For example, for invocation paths with high latency, the system may determine whether the invocation paths share a similar path length or share invocation of a common API. Other characteristics can include data access of a same storage device, common resource consumption metrics, or common hardware configurations (e.g. servers with a same processor, same amount of memory, etc.).

The system determines architecture guideline modifications based on the identified common characteristics of the flagged invocation paths (518). The system analyzes the common characteristics to determine their relation to a performance criterion and a potential remedy that can be expressed as an architecture guideline. For example, the system may have determined that a group of invocation paths which exceeded a latency threshold have a similar path length. The system may determine that an architecture guideline of a maximum path length should be enforced with the maximum path length being less than the similar path length of the group of invocation paths. As an additional example, the system may have determined a group of invocations which exceeded a target bandwidth consumption share a common characteristic of having services in each of the invocation paths being distributed across multiple servers. In response to this common characteristic, the system may modify the architecture guidelines to identify specific services which should be located on a same server so that data can be exchanged through shared storage or memory as opposed to network bandwidth.

The system implements the architecture guideline modifications (520). The system may implement the architecture guideline modifications automatically or may display them to a developer or administrator of the services. To implement the modifications automatically, the system may provide the modifications to an IDE, compiler, or code repository for the services so that the modifications will be applied during a next development cycle. After implementing the architecture guideline modifications, the process ends.

Variations

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted at blocks 208 and 210 of FIG. 2 can be performed in parallel or concurrently. Additionally, the operation depicted at block 520 of FIG. 5 may not be performed. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

Some operations above iterate through sets of items, such as services, architecture guidelines, or invocation paths. In some implementations, these items may be iterated over according to an ordering of the items, an indication of item importance, a duration associated with each item, etc. The number of iterations for loop operations may vary. Different techniques for analyzing the services, architecture guidelines, or invocation paths may require fewer iterations or more iterations. For example, multiple architecture guidelines may be applied in parallel.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 6:
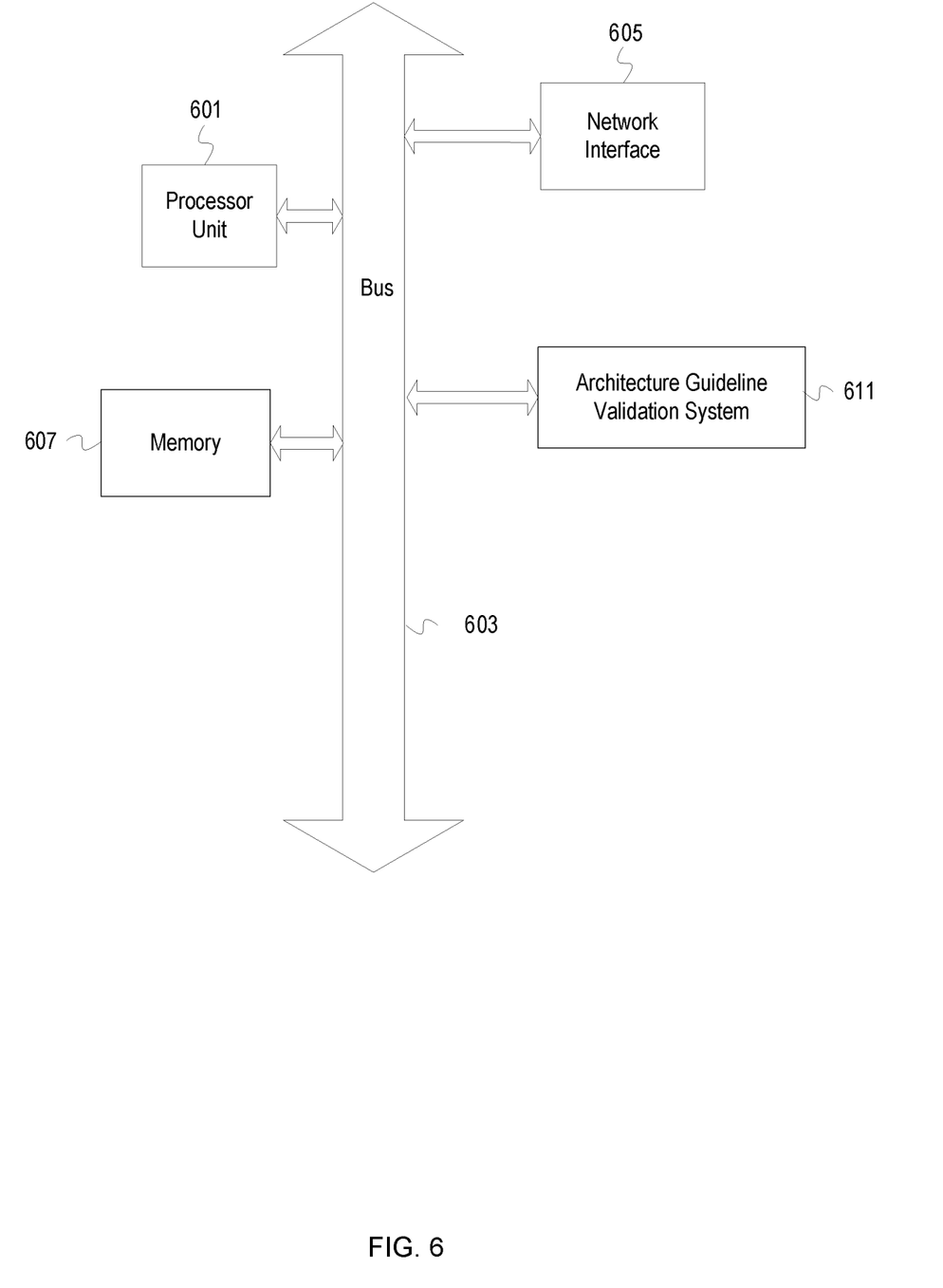
FIG. 6 depicts an example computer system with an architecture guideline validation system.

FIG. 6 depicts an example computer system with an architecture guideline validation system. The computer system includes a processor unit 601 (possibly including multiple processors, multiple cores, multiple nodes, and/or implementing multi-threading, etc.). The computer system includes memory 607. The memory 607 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 603 (e.g., PCI, ISA, PCI-Express, HyperTransport® bus, InfiniBand® bus, NuBus, etc.) and a network interface 605 (e.g., a Fiber Channel interface, an Ethernet interface, an internet small computer system interface, SONET interface, wireless interface, etc.). The system also includes architecture guideline validation system 611. The architecture guideline validation system 611 identifies violations of architecture guidelines during a development process for API services and determines modifications to the architecture guidelines to achieve performance goals during execution of the services. Any one of the previously described functionalities may be partially (or entirely) implemented in hardware and/or on the processor unit 601. For example, the functionality may be implemented with an application specific integrated circuit, in logic implemented in the processor unit 601, in a co-processor on a peripheral device or card, etc. Further, realizations may include fewer or additional components not illustrated in FIG. 6 (e.g., video cards, audio cards, additional network interfaces, peripheral devices, etc.). The processor unit 601 and the network interface 605 are coupled to the bus 603. Although illustrated as being coupled to the bus 603, the memory 607 may be coupled to the processor unit 601.

While the aspects of the disclosure are described with reference to various implementations and exploitations, it will be understood that these aspects are illustrative and that the scope of the claims is not limited to them. In general, techniques for validating compliance with architecture guidelines and determining architecture guideline modifications as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

What is claimed is:

1. A method comprising:
analyzing program code of a set of software services underlying at least one application programming interface to identify invocations among the set of software services;
generating a data structure that indicates the invocations identified from analyzing the program code;
determining that the set of software services violates architecture guidelines based, at least in part, on identifying at least one invocation path of the data structure indicating a series of inter-service invocations that exceeds a threshold invocation path length corresponding to the architecture guidelines; and
based on determining at least one violation of the architecture guidelines, indicating the violation.

2. The method of claim 1, wherein determining whether the set of software services violate the architecture guidelines further comprises at least one of:
analyzing each of the invocations in the data structure to determine whether any of the invocations are between software services of a same hierarchical level; and
analyzing each of the invocations to determine whether any of the invocations indicate that a first software service of lower hierarchical level invokes a software service of a higher hierarchical level.

3. The method of claim 1 further comprising:
collecting measurements during execution of the set of software services;
determining that the measurements indicate that a first software service of the set of software services fails to satisfy a performance criterion; and
determining a modification to the architecture guidelines based, at least in part, on the measurements and the performance criterion.

4. The method of claim 1 further comprising:
collecting measurements during execution of the set of software services;
determining that the measurements indicate that a first software service and a second software service of the set of software services fail to satisfy a performance criterion;
comparing characteristics of the first software service and the second software service; and
determining a modification to the architecture guidelines based, at least in part, on a common characteristic between the first software service and the second software service.

5. The method of claim 4, wherein the common characteristic is an invocation path length, wherein the modification to the architecture guidelines comprises changing the threshold invocation path length in the architecture guidelines.

6. The method of claim 1, wherein analyzing program code of the set of software services to identify invocations among the set of software services comprises:
determining identifiers for each software service in the set of software services; and
searching the program code using the identifiers.

7. The method of claim 1, wherein generating the data structure is part of a compilation process for the program code, wherein the violation is indicated as a warning during the compilation process.

8. The method of claim 1, wherein the data structure is a graph which comprises each software service in the set of software services as a node and indicates the invocations as edges between the nodes.

9. The method of claim 1, wherein indicating the violation comprises modifying, in the data structure, indications of software services corresponding to the violation, wherein the modification affects a depiction in a user interface of the software services corresponding to the violation.

10. One or more non-transitory machine-readable media comprising program code for validating compliance with architectural guidelines for a set of software services, the program code to:
analyze program code of a set of software services underlying at least one application programming interface to identify invocations among the set of software services;
generate a data structure that indicates the invocations identified from analyzing the program code;
determine that the set of software services violates architecture guidelines based, at least in part, on identifying at least one invocation path of the data structure indicating a series of at least a subset of the invocations exceeds a threshold invocation path length corresponding to the architecture guidelines; and based on a determination that at least one violation of the architecture guidelines, indicate the violation.

11. The machine-readable media of claim 10, wherein the program code to determine whether the set of software services violate the architecture guidelines further comprises program code to at least one of:

analyze each of the invocations in the data structure to determine whether any of the invocations are between software services of a same hierarchical level; and analyze each of the invocations to determine whether any of the invocations indicate that a first software service of lower hierarchical level invokes a software service of a higher hierarchical level.

12. An apparatus comprising:

a processor; and a machine-readable medium having program code executable by the processor to cause the apparatus to, analyze program code of a set of software services underlying at least one application programming interface to identify invocations among the set of software services;

generate a data structure that indicates the invocations identified from analyzing the program code;

determine that the set of software services violates architecture guidelines based, at least in part, on identifying at least one invocation path of the data structure indicating a series of inter-service invocations that exceeds a threshold invocation path length corresponding to the architecture guidelines; and based on a determination that at least one violation of the architecture guidelines, indicate the violation.

13. The apparatus of claim 12, wherein the program code executable by the processor to cause the apparatus to determine whether the set of software services violate the architecture guidelines further comprises program code executable by the processor to cause the apparatus to at least one of:

analyze each of the invocations in the data structure to determine whether any of the invocations are between software services of a same hierarchical level; and analyze each of the invocations to determine whether any of the invocations indicate that a first software service of lower hierarchical level invokes a software service of a higher hierarchical level.

14. The apparatus of claim 12 further comprising program code executable by the processor to cause the apparatus to:

collect measurements during execution of the set of software services;

determine that the measurements indicate that a first software service of the set of software services fails to satisfy a performance criterion; and determine a modification to the architecture guidelines based, at least in part, on the measurements and the performance criterion.

15. The apparatus of claim 12 further comprising program code executable by the processor to cause the apparatus to:

collect measurements during execution of the set of software services;

determine that the measurements indicate that a first software service and a second software service of the set of software services fail to satisfy a performance criterion;

compare characteristics of the first software service and the second software service; and determine a modification to the architecture guidelines based, at least in part, on a common characteristic between the first software service and the second software service.

16. The apparatus of claim 15, wherein the common characteristic is an invocation path length, wherein the modification to the architecture guidelines comprises changing the threshold invocation path length in the architecture guidelines.

17. The apparatus of claim 12, wherein the program code executable by the processor to cause the apparatus to analyze program code of the set of software services to identify invocations among the set of software services comprises program code executable by the processor to cause the apparatus to:

determine identifiers for each software service in the set of software services; and search the program code using the identifiers.

18. The apparatus of claim 12, wherein the program code executable by the processor to cause the apparatus to generate the data structure is part of a compilation process for the program code, wherein the violation is indicated as a warning during the compilation process.

19. The apparatus of claim 12, wherein the data structure is a graph which comprises each software service in the set of software services as a node and indicates the invocations as edges between the nodes.

20. The apparatus of claim 12, wherein the program code executable by the processor to cause the apparatus to indicate the violation comprises modifying, in the data structure, indications of software services corresponding to the violation, wherein the modification affects a depiction in a user interface of the software services corresponding to the violation.

* * * * *